United States Patent [19]

Onishi et al.

[11] Patent Number: 5,253,322
[45] Date of Patent: Oct. 12, 1993

[54] OPTICAL FUNCTIONING GLASS AND FIBER AMPLIFIER

[75] Inventors: Masashi Onishi; Yoshiki Chigusa; Koji Nakazato; Minoru Watanabe, all of Yokohama; Yoshiaki Miyajima; Tomoki Sugawa, both of Mito, all of Japan

[73] Assignee: Sumitomo Electric Industries, Ltd., Osaka, Japan

[21] Appl. No.: 716,801

[22] Filed: Jun. 20, 1991

[30] Foreign Application Priority Data

Jun. 20, 1990 [JP] Japan .................. 2-161785
Jun. 20, 1990 [JP] Japan .................. 2-161786
Jun. 26, 1990 [JP] Japan .................. 2-167408
Aug. 22, 1990 [JP] Japan .................. 2-220619

[51] Int. Cl.$^5$ ............................................. G02B 6/16
[52] U.S. Cl. ........................................... 385/142; 372/6; 501/37
[58] Field of Search ............... 350/96.30, 96.31, 96.32, 350/96.33, 96.34; 385/142, 140, 141, 147, 122, 123, 124; 359/341, 329; 372/6, 69; 501/37, 45; 252/301.4 P, 301.4 H

[56] References Cited

U.S. PATENT DOCUMENTS

| | | | |
|---|---|---|---|
| 3,462,707 | 5/1965 | Pearson et al. | 372/40 |
| 3,599,114 | 8/1971 | Snitzer | 501/37 |
| 4,770,811 | 9/1988 | Myers | 501/45 X |
| 4,782,491 | 11/1988 | Snitzer | 350/96.34 X |
| 4,788,687 | 11/1988 | Miniscalco et al. | 350/96.34 X |
| 4,962,995 | 10/1990 | Andrew et al. | 350/96.34 |
| 5,027,079 | 6/1991 | Desurvive et al. | 350/96.34 X |

OTHER PUBLICATIONS

B. J. Ainslie et al, "The Absorption and Fluorescence Spectra of Rare Earth Ions in Silica-Based Monomode Fiber", Journal of Lightwave Technology, Feb. 1988, vol. 6, No. 2, pp. 287–293.

M. Brierley et al, "Amplification in the 1300nm telecommunications window in a Nd–doped fluoride fibre", Electronics Letters, Mar. 1, 1990, vol. 26, No. 5, pp. 329–330.

M. C. Farries et al, "Very high-rejection optical fibre filters", Oct. 9, 1986, vol. 22, No. 21, pp. 1126–1128.

D. Fay et al, "Linear concentration quenching of luminescence in rare earth laser materials", Optics Communications, Jan. 1979, vol. 28, No. 1, pp. 117–122.

G. Huber et al, "Laser pumping of Ho-, Tm-, Er--doped garnet lasers at room temperature", Ieee Journal of Quantum Electronics, Jun. 1988, vol. 24, No. 6, pp. 920–923.

E. J. Sharp et al, "Energy Transfer and Fluorescence Quenching in Eu- and Nd-Doped Silicate Glasses", Journal of Applied Physics, Jan. 1970, vol. 41, No. 1, pp. 364–369.

*Primary Examiner*—Brian Healy
*Assistant Examiner*—Phan T. Heartney
*Attorney, Agent, or Firm*—Cushman, Darby & Cushman

[57] ABSTRACT

The present invention relates to an optical functioning glass containing $Nd^{+3}$ as an active ion which amplifies an input light, and at least one other optical active ion different from $Nd^{+3}$ which absorbs light at and near 1 $\mu m$. The present invention also relates to an optical functioning glass containing $Nd^{+3}$ as an active ion which amplifies the input light, and at least one other optical active ion different from $Nd^{+3}$ functioning as a promoter. An efficiency of the stimulated emission of $Nd^{3+}$ caused by signal light propagated through the optical functioning glass is enhanced and a gain of the light amplification at 1.3 $\mu m$ is increased.

10 Claims, 12 Drawing Sheets

CONCENTRATION OF $Sm^{3+}$ TO $Nd^{3+}$

Fig. 12

CONCENTRATION OF $Yb^{3+}$ TO $Nd^{3+}$

OPTICAL FUNCTIONING GLASS AND FIBER AMPLIFIER

BACKGROUND OF THE INVENTION

1. Field of the Invention

The present invention relates to an optical functioning glass, an optical fiber and an optically active device which are used for light amplification at 1.3 μm band.

2. Related Background Art

Efforts have been made to manufacture an optically active device such as a fiber amplifier, a fiber sensor or a fiber laser by using glass doped with a rare earth element, for the application to a light communication at the 1.3 μm band. For example, a report has been made (Electronics Letters, 1990, Vol. 26, No. 2, pp. 121–122) in which neodymium ions ($Nd^{3+}$) are added to phosphate-based glass and a laser oscillation characteristic of an optical fiber made by such glass is evaluated. It reports about the optical fiber characteristic that a fluorescent peak wavelength of $Nd^{3+}$ is 1.32 μm, a peak wavelength due to an excited state absorption (ESA) is approximately 1.31 μm and an amplification peak wavelength is 1.36 μm.

However, in the reported phosphate glass, a laser oscillation gain is not attained at the 1.3 μm wavelength band. It is considered that the reasons for not attaining the laser oscillation gain are that the fluorescent peak of $Nd^{3+}$ at the 1.32 μm wavelength band is relatively weak and a relatively large absorption peak by the ESA transition lies at the wavelength of 1.31 μm.

Further, where the light amplification is effected by utilizing the stimulated emission as the above optical fiber does, problems are not only that the fluorescent peak at the wavelength of 1.3 μm is small but also that there is another fluorescent peak due to a possible transition. In the above optical fiber, in addition to the fact that the fluorescent peak of $Nd^{3+}$ at the wavelength of 1.3 μm band is relatively weak, light emissions at the 0.8 μm and the 1.06 μm wavelength band corresponding to other possible transition of $Nd^{3+}$ are relatively strong. Due to the stimulated emission by the light emissions at the 0.8 μm and the 1.06 μm wavelength band, the stimulated emission at the 1.3 μm wavelength band is impeded and an efficiency is significantly reduced.

SUMMARY OF THE INVENTION

In the light of the above, it is an object of the present invention to provide optical functioning glass which enables light amplification in an 1.3 μm wavelength band or enhances an amplification efficiency.

It is another object of the present invention to provide an optical fiber and an waveguide device which uses the above optical functioning glass.

It is other object of the present invention to provide an optically active device which uses the above optical fiber and the above waveguide device.

It is other object of the present invention to provide a fiber amplifier and a waveguide amplifier which use the above optical fiber and the above waveguide device.

It is a further object of the present invention to provide a fiber laser and a waveguide laser which uses the above optical fiber and the above waveguide device.

It is a further object of the present invention to provide an optical functioning glass which contains $Nd^{3+}$ as an active ion and which enables the light amplification in the 1.3 μm wavelength band or enhances the amplification efficiency.

It is a further object of the present invention to provide an optical functioning glass doped with $Nd^{3+}$ which serves as the active ion, and codoped with a rare earth ion which exhibits an absorption band at and near the wavelength 1 μm and functioning as an absorbing element. Oxide-based glass such as phosphate glass, fluoride-based glass or chalcogenide glass may be used as the multi-component glass which serves as host glass (matrix glass).

In accordance with the above optical functioning glass the light emission of $Nd^{3+}$ at and near 1 μm wavelength (for example, 1.06 μm or 0.88 μm wavelength band) can be absorbed by the presence of the absorbing element such as praseodymium ion ($Pr^{3+}$) which is added together with $Nd^{3+}$. As a result, the glass which enables the light emission and the light amplification of $Nd^{3+}$ at the 1.3 μm wavelength band and enhances the efficiency and the gain is provided. The absorbing element which absorbs the light emission at the 1.06 μm wavelength band is preferably $Pr^{3+}$, ytterbium ions ($Yb^{3+}$) or samarium ions ($Sm^{3+}$). The absorbing element which absorbs the light emission at the 0.88 μm wavelength band is preferably holmium ions ($Ho^{3+}$). The effect of the absorbing element is further enhanced when the concentration of $Pr^{3+}$, $Yb^{3+}$ or $Sm^{3+}$ is 50 to 150% by weight to $Nd^{3+}$.

It is a further object of the present invention to provide an optical functioning glass doped with $Nd^{3+}$ which serves as the active ion, and codoped with a rare earth ion which exhibits an energy absorption at about 4000 $cm^{-1}$ and functioning as a promoting element. Oxide-based glass such as phosphate glass, fluoride-based glass or chalcogenide glass may be used as the multi-component glass which serves as host glass (matrix glass).

In accordance with the above optical functioning glass, the efficiency of the light emission of $Nd^{3+}$ at 1.3 μm wavelength band is enhanced by the presence of the promoting element such as terbium ions ($Tb^{3+}$) which are added together with $Nd^{3+}$. As a result, the glass enables the light emission and the light amplification of $Nd^{3+}$ at the 1.3 μm wavelength band and enhances the efficiency and the gain. The promoting element which promotes the light emission at the 1.3 μm wavelength band is preferably $Tb^{3+}$ or europium ions ($Eu^{3+}$).

It is a further object of the present invention to provide an optical fiber comprising a core which is made of the above optical functioning glass.

With such an optical fiber, the light amplification of the 1.31 μm wavelength light propagating in the core glass or the enhancement of the light amplification gain is attained because the absorbing element and/or the promoting element are added together with $Nd^{3+}$ in the core glass. Because the light is efficiently confined in the core by the fiber structure and the loss of the confined light is very low, the inverted distribution can be formed in $Nd^{3+}$ at a low threshold.

It is a further object of the present invention to provide an optically active device comprising the above optical fiber, an excitation light source and optical means. The optical fiber propagates or transmits light at the 1.3 μm wavelength band, the excitation light source emits the excitation light at the 0.8 μm wavelength band, and the optical means directs the excitation light from the excitation light source to the optical fiber.

In accordance with the above optically active device, $Nd^{3+}$ is excited by the excitation light at the 0.8 μm wavelength band directed into the fiber by the optical means. Most of the excited $Nd^{3+}$ are stimulated by the light at the 1.3 μm wavelength band coupled into the fiber to generate the radiation light so that the light amplification light switching and light sensing at the 1.3 μm wavelength band is attained.

It is a further object of the present invention to provide the fiber amplifier comprising the above optical fiber, an excitation light source and optical means. The optical fiber propagates signal light at the 1.3 μm wavelength band, the excitation light source emits the excitation light at the 0.8 μm wavelength band, and the optical means directs the excitation light from the excitation light source to the optical fiber.

In accordance with the above fiber amplifier, $Nd^{3+}$ is excited by the excitation light at the 0.8 μm wavelength band directed into the fiber by the optical means. Most of the excited $Nd^{3+}$ are stimulated by the signal light at the 1.3 μm wavelength band coupled into the fiber to generate the radiation light so that the light amplification at the 1.3 μm wavelength band is attained.

It is a further object of the present invention to provide the fiber laser comprising the above optical fiber, an excitation light source and optical fiber, an excitation light source and optical means. The excitation light source generates the excitation light at the 0.8 μm wavelength band and the optical means directs the excitation light from the excitation light source to the optical fiber. The fiber laser of the present invention has a resonator which feeds the light at the 1.3 μm wavelength band or in the vicinity thereof from the optical fiber back to the optical fiber.

In accordance with the above fiber laser, $Nd^{3+}$ is excited by the excitation light at the 0.8 μm wavelength band directed into the fiber by the optical means. A portion or most of the excited $Nd^{3+}$ are stimulated by the spontaneous emission at the 1.3 μm wavelength band to generate radiation light so that the light amplification at the 1.3 μm wavelength band is attained.

By substituting the above optical fiber with a waveguide device, a very compact waveguide amplifier and a waveguide laser are provided.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENT

A principle of the present invention and a history of the accomplishment of the present invention are now explained.

The inventors set two hypothesis for the above phenomenon. Those hypothesis are explained in sequence.

FIRST HYPOTHESIS

The excitation light at the 0.8 μm band directed into the optical functioning glass having $Nd^{3+}$ added thereto excites active ions $Nd^{3+}$. As a result, the radiation at the 1.3 μm band corresponding to the transition from an energy level $^4F_{3/2}$ to an energy level $^4I_{13/2}$ is permitted. Other radiation, that is, the radiation at the 1.06 μm wavelength band or the 0.88 μm wavelength band corresponding to the transition from an energy level $^4F_{3/2}$ to an energy level $^4I_{11/2}$ or $^4I_{9/2}$ is permitted. The above phenomenon of the Nd ions are statistically analyzed. Most of $Nd^{3+}$ in the host glass are excited and in a state to permit the transition corresponding to the light emission at the 1.3 μm wavelength band. The undesirable transitions corresponding to the light emissions at the 0.88 μm wavelength band and the 1.06 μm wavelength band are also permitted. A portion of the excited $Nd^{3+}$ emit light at the 1.3 μm wavelength band at a predetermined probability by spontaneous emission or stimulated emission. Another portion of the excited $Nd^{3+}$ emit a light at the 0.88 μm wavelength band or the 1.06 μm wavelength band instead of the 1.3 μm wavelength band at a predetermined probability by the spontaneous emission or the stimulated emission. If certain amount of absorbing element for the radiation light at the 0.88 μm wavelength band or the 1.06 μm wavelength band which does not serve as the absorbing element for the radiation light at the 1.3 μm wavelength band is codoped in the host glass, the absorbing element absorbs the radiated light at the 0.88 or 1.06 μm wavelength band. By this absorption, the induced radiation due to the radiation light at the 0.88 or 1.06 μm wavelength band can be suppressed. For example, where the absorbing element for the radiation light of only the 1.06 μm wavelength band is used, the absorbing element can suppress the light emission at least the 1.06 μm wavelength band of $Nd^{3+}$ so that the reduction of the efficiency of the stimulated emission at the 1.3 μm wavelength band is prevented. Where the absorbing element for the light at the 0.88 μm wavelength band is used, the light emission at least the 0.88 μm wavelength band can be suppressed so that the reduction of the efficiency of the stimulated emission at the 1.3 μm wavelength band is prevented.

The above hypothesis is explained in more detail with reference to FIGS. 1, 2 and 3.

Figure 2:
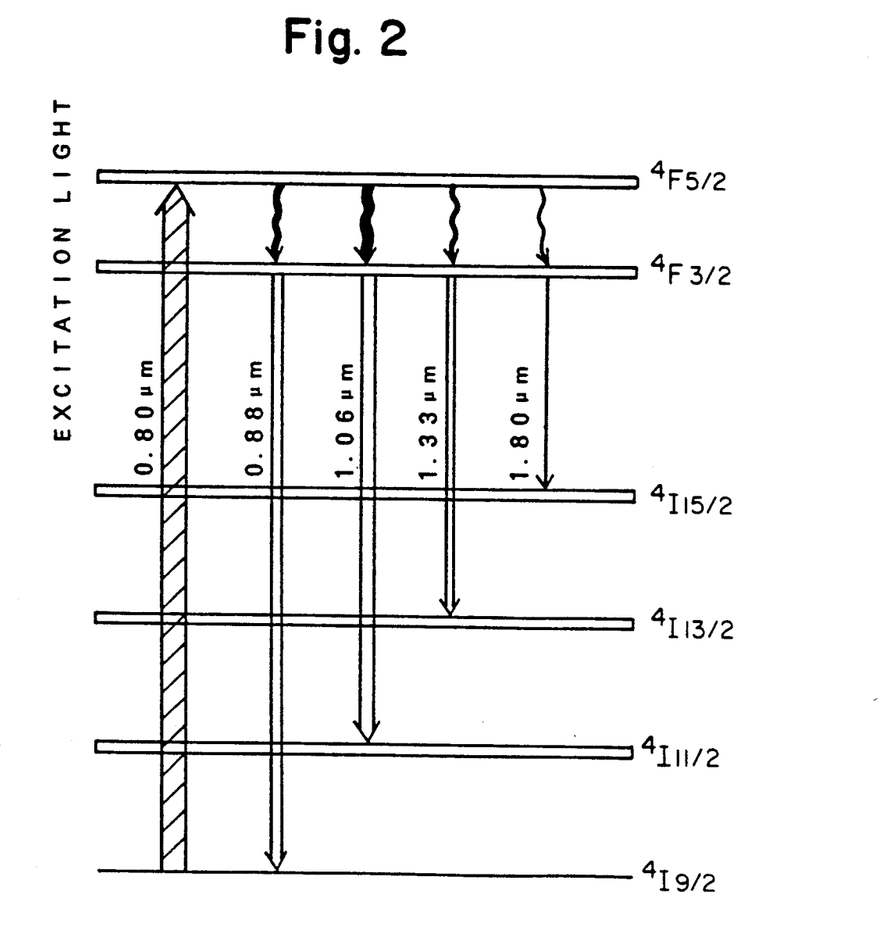
FIG. 2 shows energy levels of $Nd^{3+}$.

FIG. 2 shows energy levels of $Nd^{3+}$ added to a phosphate glass sample. The wavelength of the absorbing and emitting transition shown in FIG. 2 were calculated based on the measurement of the fiber made of the above glass by a self-recording spectrophotometer and an optical spectrum analyzer. Major transitions are explained below. Electrons at a ground level $^4I_{9/2}$ are excited to a level $^4F_{5/2}$ by an excitation light of approximately 0.80 μm. and they transit to a level $^4F_{3/2}$ by multi-phonon relaxation. By such pumping, an inverted distribution is formed between the level $^4F_{3/2}$, and the levels $^4I_{9/2}$, $^4I_{11/2}$, $^4I_{13/2}$ and $^4I_{15/2}$, so that the light emissions having peaks at the wavelengths of 0.88 μm, 1.06 μm, 1.33 μm and 1.80 μm are permitted. Of those, the ratio of intensities of the light emissions at the wavelengths of 0.88 μm, 1.06 μm and 1.33 μm is determined from the ratio of heights of fluorescent peaks when only the excitation light is directed to the fiber. The ratio was approximately 5:9:1. The light emission intensity at the wavelength of 1.80 μm is relatively small and was not determined.

Figure 1A:
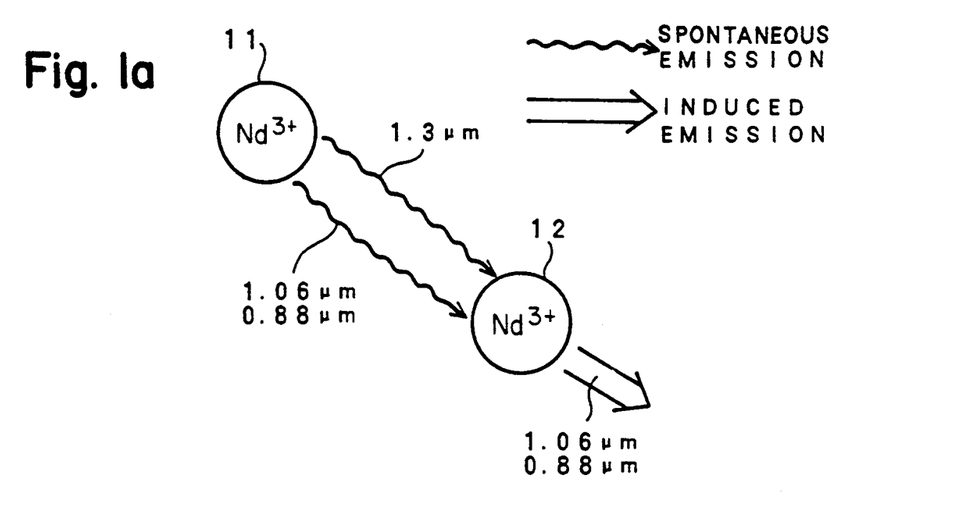
FIG. 1a and b illustrates a function of ions of a rare earth element which is added to optical functioning glass of the present invention to serve as absorbing element.
Figure 1B:
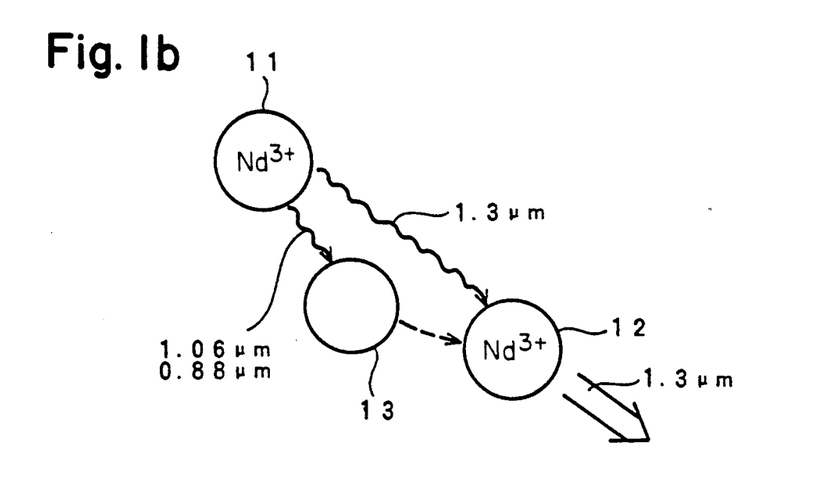

FIG. 1 shows a method for reducing the stimulated or induced emission by the light emission at the 1.06 or 0.88 μm wavelength band due to the fact that the probability of this light emission is very high.

Referring to FIG. 1(a), an excited first Nd ions 11 emit a light at the 1.3 μm, 0.88 μm or 1.06 μm wavelength band by the spontaneous emission. Since the probability of light emission at the 0.88 μm and 1.06 μm wavelength band is very high, most of second Nd ions 12 induced by the spontaneous emission light emit light at the 0.88 μm or 1.06 μm wavelength band. On the other hand, referring to FIG. 1(b), the excited first Nd ions 11 emit light at the 1.3 μm, 0.88 μm or 1.06 μm wavelength band, like in FIG. 1(a). If there is an absorbing element 13 which absorbs light at the 0.88 μm or 1.06 μm wavelength band having a high probability of light emission, the emitted light at the 0.88 μm or 1.06 μm wavelength band is absorbed by the absorbing element 13 so that it does not affect to the second Nd ions 12.

In the present invention, an absorber (or absorbing element) for the 1.06 μm wavelength band and an absorber (or absorbing element) for the 0.88 μm wavelength band are used. Since the probability of light emission at the 1.06 μm wavelength band is relatively high, the absorber for the 1.06 μm wavelength band can effectively enhance the probability of stimulated emission at the 1.3 μm wavelength band. On the other hand, the absorber for the 0.88 μm wavelength band cannot suppress the stimulated emission due to the emitted light at the 1.06 μm wavelength band but it can suppress at least the stimulated emission due to the emitted light at the 0.88 μm wavelength band so that the probability of the stimulated emission at the 1.3 μm wavelength band is enhanced.

Requirements for the absorber for the 1.06 μm or 0.88 μm wavelength band are that it absorbs the spontaneous emission light or stimulated emission light at the wavelength of approximately 1.06 μm or 0.88 μm and it does not absorb the emitted light at the wavelength of approximately 1.3 μm. When active ions are used as such an absorber and they are added to the host glass together with $Nd^{3+}$, the use of transition metal ions having a broad absorption band is not proper and the use of rare earth ions having a sharp absorption band is preferable. It is necessary that there are a number of electrons in an energy level to be excited, a states density of an energy level to which the ions are to be transited is high, and an occupation factor of that level is high.

Figure 3:
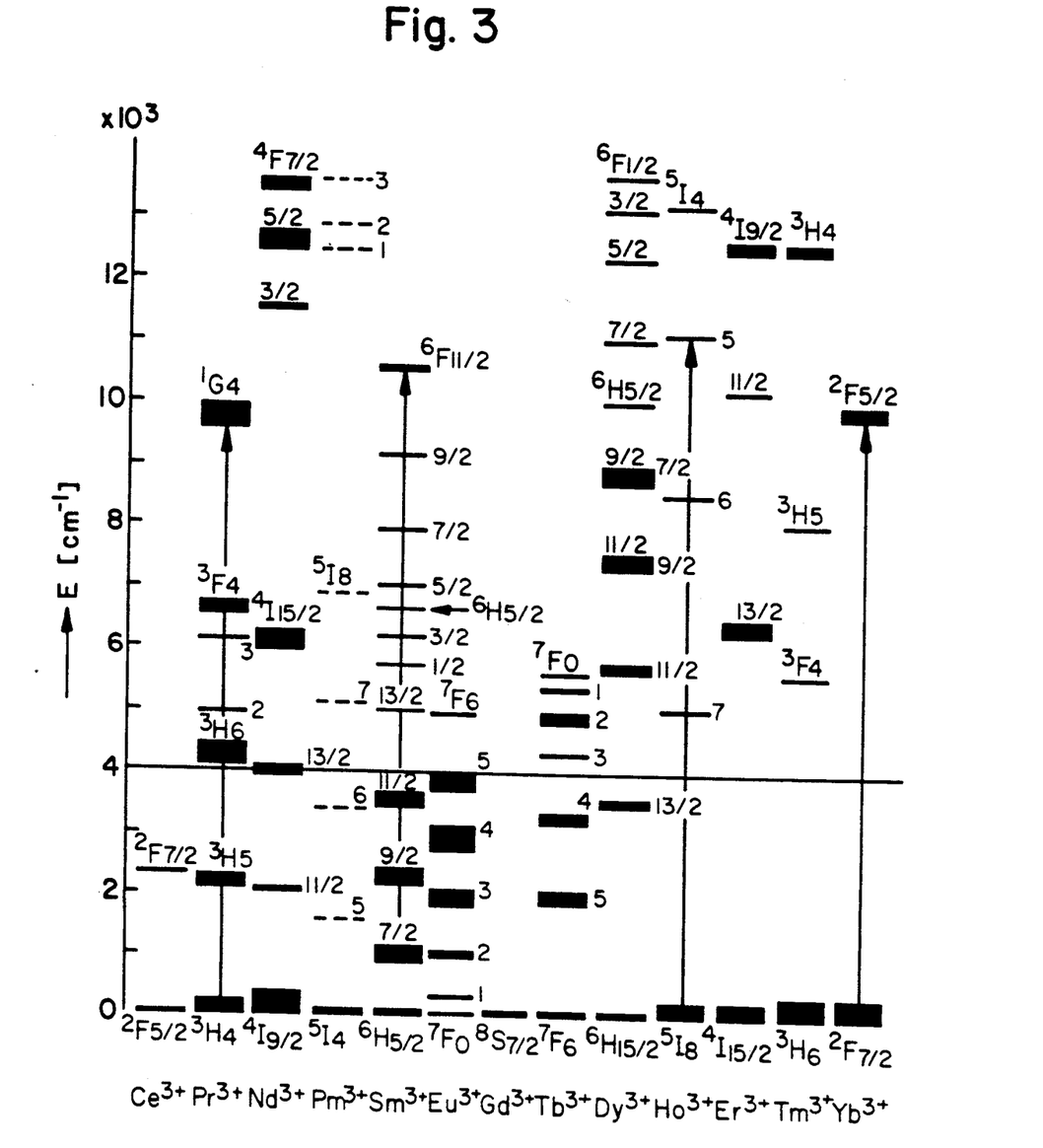
FIG. 3 shows energy levels of ions of various rare earth elements.

FIG. 3 shows the selection of the rare earth ions under such requirements. The energy levels of the rare earth ions shown in FIG. 3 are those in a crystal.

A first preferable candidate to the rare earth ion which meets the above requirements is $Pr^{3+}$, $Yb^{3+}$ or $Sm^{3+}$ because it has a high probability of absorption at the wavelength of 1.06 μm and a probability of absorption at 1.3 μm in negligible. The transition $^3H_4$ to $^1G_4$ of $Pr^{3+}$ corresponds to an energy of approximately 9700 $cm^{-1}$ and corresponds to an emitted light at the wavelength of 1.06 μm (9400 $cm^{-1}$). The transition $^2F_{7/2}$ to $^2F_{5/2}$ of $Yb^{3+}$ and the transition $^6H_{7/2}$ to $^6F_{11/2}$ of $Sm^{3+}$ also correspond energies of approximately 9600 $cm^{-1}$ and approximately 9500 $cm^{-1}$, respectively, which correspond to the emitted light at the wavelength of 1.06 μm. It is considered that no inverted distribution is formed in the rare earth ions such as $Pr^{3+}$ by the absorption by the spontaneous emission.

It is not clear whether the above hypothesis is correct or not. In any case, it has been found by the experiment and study by the inventors of the present invention that the emitted light of $Nd^{3+}$ at the 1.06 μm band can be absorbed by $Pr^{3+}$ by adding $Pr^{3+}$ to the glass having $Nd^{3+}$ added thereto as the activation material, or adding $Pr^{3+}$ within a range of 50 to 150% to $Nd^{3+}$ and the glass permits the light amplification at the 1.3 μm wavelength band or enhances the amplification efficiency. It has also been found that preferable glass can be provided by adding $Sm^{3+}$ to the glass having $Nd^{3+}$ added thereto as the active ion or adding $Sm^{3+}$ within the range of 50 to 150% to $Nd^{3+}$. It has also been found that preferable glass can be provided by adding $Yb^{3+}$ to the glass having $Nd^{3+}$ added thereto as the active ion or adding $Yb^{3+}$ of more than 50% to $Nd^{3+}$ and less than an amount which deteriorates the glass forming ability.

A second candidate to the rare earth ions which meet the above requirements is $Ho^{3+}$ which has a high probability of absorption at the wavelength of 0.88 μm and a negligible probability of absorption at the wavelength of 1.3 μm. The transition $^5I_8$ to $^5I_5$ of $Ho^{3+}$ corresponds an energy of approximately 11,000 $cm^{-1}$ and corresponds to the wavelength of 0.88 μm (approximately 11,400 $cm^{-1}$).

It is not clear whether the above hypothesis is clear or not. In any case, according to the experiment and study by the inventors of the present invention, the glass which can absorb the light emission of $Nd^{3+}$ at the 0.88 μm wavelength band by $Ho^{3+}$ and permits the light amplification at the 1.3 μm wavelength band or enhances the amplification efficiency is provided by adding $Ho^{3+}$ together with $Nd^{3+}$ to the glass.

SECOND HYPOTHESIS

The excitation light at the 0.8 μm band directed to the optical functioning glass having $Nd^{3+}$ added thereto excites $Nd^{3+}$ which is the active ion. As a result, the radiation at the 1.3 μm band corresponding to the transition $^4F_{3/2}$ to $^4I_{13/2}$ is permitted. Other radiation, that is, the radiation at the 1.06 μm wavelength band or the 0.88 μm wavelength band corresponding to the transition from the energy level $^4F_{3/2}$ to the energy level $^4I_{11/2}$ or $^4I_{9/2}$ is also permitted.

The above phenomenon for the Nd ions is statistically analyzed. Most of $Nd^{3+}$ in the host glass are excited by the excitation light at the 0.8 μm band so that the transitions corresponding to the light emissions at the 1.06 μm wavelength band, 0.88 μm wavelength band and 1.3 μm wavelength band are permitted. A portion of the excited $Nd^{3+}$ emit light at the 1.3 μm wavelength band at a predetermined probability by the spontaneous emission. Another portion of the excited $Nd^{3+}$ emit light at the 1.06 μm wavelength band and 0.88 μm wavelength band by the spontaneous emission at a higher probability than that of the light emission at the 1.3 μm wavelength band. If a certain amount of light emission promoter or promoting element for the light emission at only the 1.3 μm wavelength band is included in the host glass to promote the radiation of the light of $Nd^{3+}$ at the 1.3 μm wavelength band, the promoting element promotes the radiation of the light of $Nd^{3+}$ at only the 1.3 μm wavelength band and enhances the efficiency of the stimulated emission at the 1.3 μm wavelength band. Further, since the probability of light emission at the 1.06 μm and 0.88 μm wavelength bands are relatively reduced, the possibility of impeding the stimulated emission at the 1.3 μm wavelength band by the light at the 1.06 μm wavelength band is reduced.

The above hypothesis is now explained in detail with reference to FIGS. 2 to 4.

As explained above in connection with FIG. 2, the light emissions having the peaks at the wavelengths of 0.88 μm, 1.06 μm and 1.33 μm are permitted by the presence of the excitation light having the wavelength of 0.80 μm. The intensities of the light emissions are those of the spontaneous emissions unless there is an external cause, and the ratio is approximately 5:9:1. It is seen that the probability of light emission at the 1.3 μm band is much lower than the probabilities of light emissions at the 1.06 μm band and the 0.88 μm band.

Figure 4:
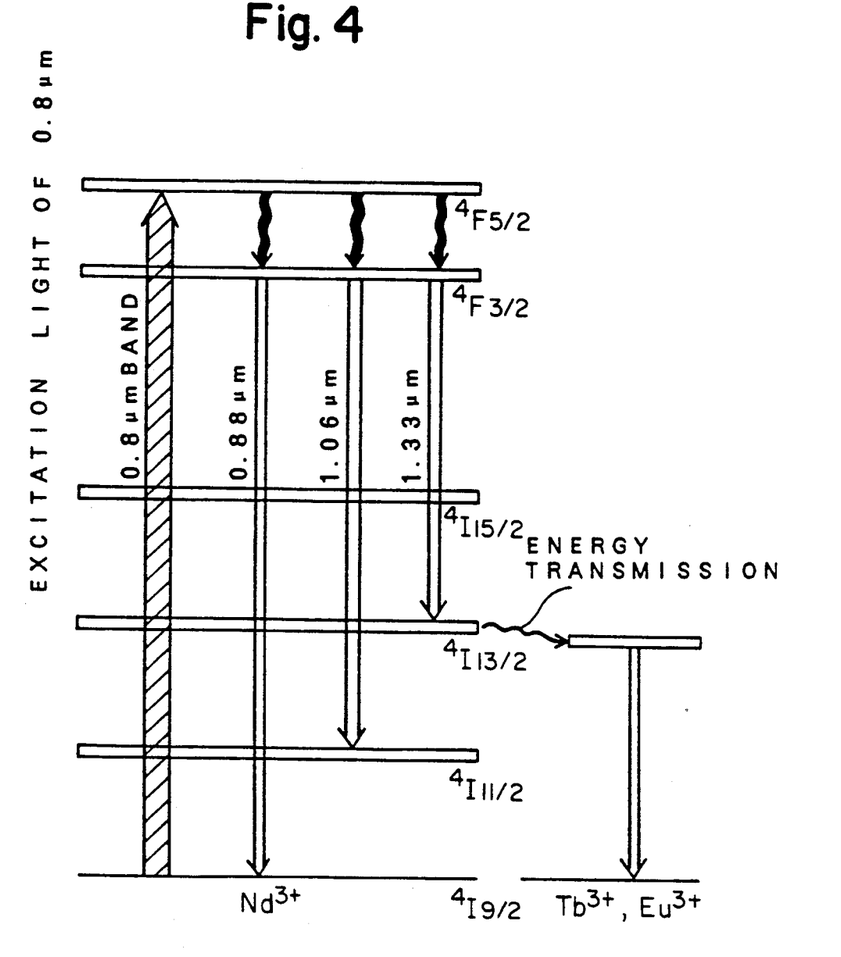
FIG. 4 illustrates a function of ions of a rare earth element which is added to the optical functioning glass to serve as promoting element.

FIG. 4 shows an method for enhancing the probability of light emission at the 1.3 μm wavelength band and preventing the reduction of the efficiency of the stimulated emission at the 1.3 μm wavelength band due to the light emissions at the 1.06 μm and the 0.88 μm wavelength band.

The $Nd^{3+}$ excited by the light at the 0.8 μm wavelength band emit lights at the 0.88 μm and the 1.3 μm wavelength band by the spontaneous emission. If there are radical ions having the excitation level approximately 4000 $cm^{-1}$ above the ground level, in the vicinity of $Nd^{3+}$ as the promoting element to promote the radiation of the light at only the 1.3 μm wavelength band, the electrons at the excitation state at the energy level $^4I_{13/2}$ of $Nd^{3+}$ can be effectively transited to the ground level $^4I_{9/2}$. By the energy transmission from the excited electrons at the energy level $^4I_{13/2}$ of $Nd^{3+}$, many electrons at the ground level of the radical ions are excited to the excitation level, and many electrons at the level $^4I_{13/2}$ of $Nd^{3+}$ are transferred to the ground level $^4I_{9/2}$. In other words, the excited electrons at the level $^4I_{13/2}$ of $Nd^{3+}$ are effectively relaxed not only through the radiation process and the phonon emission process but also through the energy transmission with the neighboring radical ions. As a result, the degree of the inverted distribution between the energy level $^4F_{3/2}$ and the level $^4I_{13/2}$ of most $Nd^{3+}$ is enhanced and the light emission at the 1.3 μm wavelength band is promoted. Further, as the probability of the light emission at the 1.3 μm wavelength band increases, the probability of the light emission at the 1.06 μm wavelength band is relatively lowered. When a signal light at the 1.3 μm band is applied to the glass including such $Nd^{3+}$, the possibility of impeding the stimulated emission at the 1.3 μm wavelength band by the light emissions at the 1.06 μm and the 0.88 μm wavelength band is reduced and the light emission is effectively done. Accordingly, in spite of the presence of the absorption at the 1.3 μm wavelength band due to the ESA, the light amplification and emission at the 1.3 μm wavelength band is permitted and the gain of the light amplification is increased.

The requirements for the above promoting element are that it has an energy level approximately 4000 $cm^{-1}$ above the ground level, it does not absorb the light emission at the wavelength band of approximately 1.3 μm and it does not absorb the excitation light. Where radical ions are used as the promoting element and they are added to the host glass together with $Nd^{3+}$, the use of the transition metal which has a broad absorption band is not proper and the use of the rare earth element which has a sharp absorption band is preferable. Further, it is desirable that the state density of the energy level approximately 4000 $cm^{-1}$ above the ground level of the radical ions is high.

As shown in FIG. 3, a preferable candidate for the rare earth ion which meets the above requirements is $Tb^{3+}$ or $Eu^{3+}$. The transition $^7F_6$ to $^7F_4$ of $Tb^{3+}$ and the transition of $^7F_0$ to $^7F_5$ of $Eu^{3+}$ have the wavenumber of approximately 3200 $cm^{-1}$ and approximately 3800 $cm^{-1}$, respectively, which substantially correspond to the wavenumber 4000 $cm^{-1}$ which is a difference between energies of the level $^4I_{11/2}$ and the level $^4I_{9/2}$.

It is not clear whether the above hypothesis is correct or not. In any case, in accordance with the experiment and study by the inventors of the present invention, the glass which can promote the light emission of $Nd^{3+}$ at the 1.3 μm wavelength band by $Tb^{3+}$ or $Eu^{3+}$ and permits the light amplification at the 1.3 μm wavelength band or enhances the amplification efficiency is provided by adding $Tb^{3+}$ and/or $Eu^{3+}$ to the glass together with $Nd^{3+}$.

APPLICATIONS OF OPTICAL FUNCTIONING GLASS (1) Optical Fiber

The above optical functioning glass may be used as a material for a light-transmission line to form a planar waveguide. It is preferable to prepare an optical fiber comprising a core made of the above optical functioning glass and a clad which surrounds the core and has a lower refractive index than that of the core in order to attain a long light-transmission line.

Figure 5:
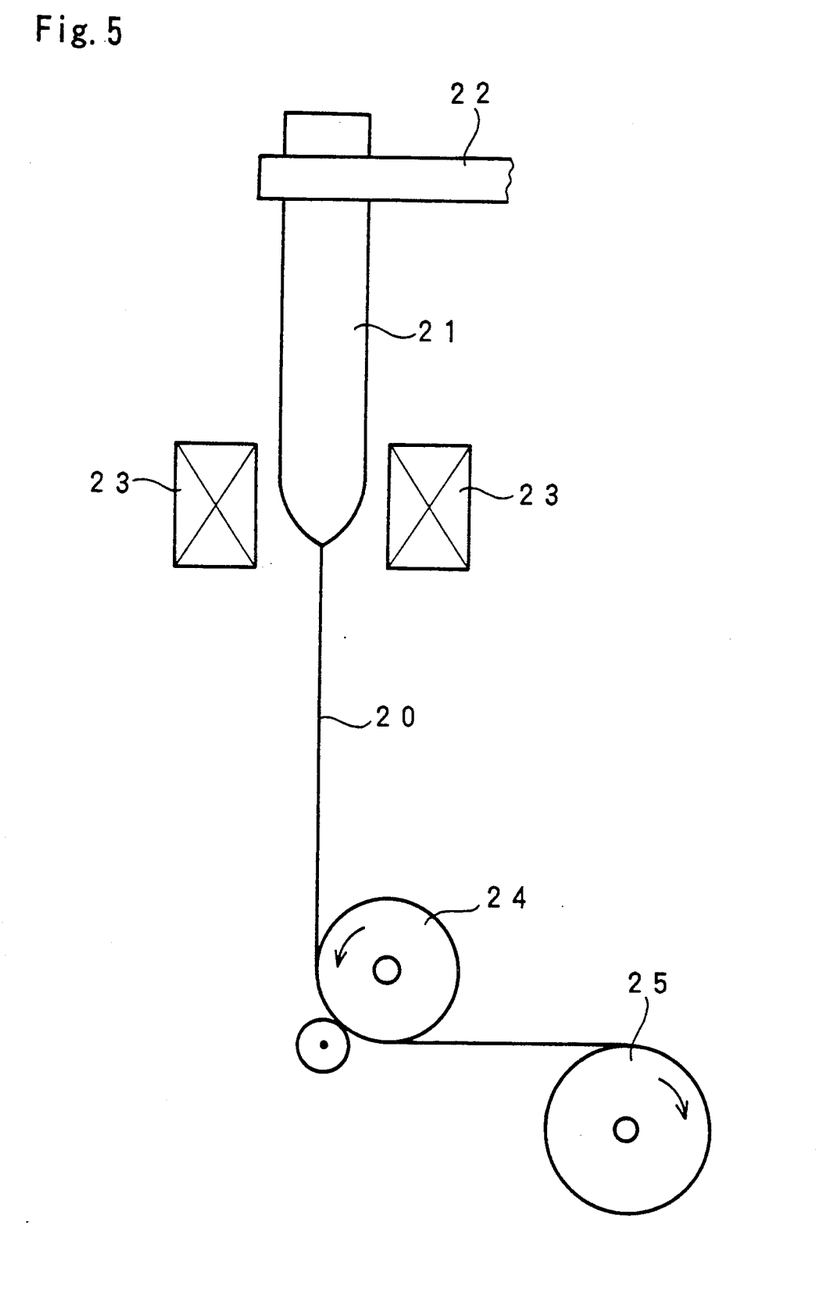
FIG. 5 shows a fiber drawing machine for the optical functioning glass.
Figure 6:
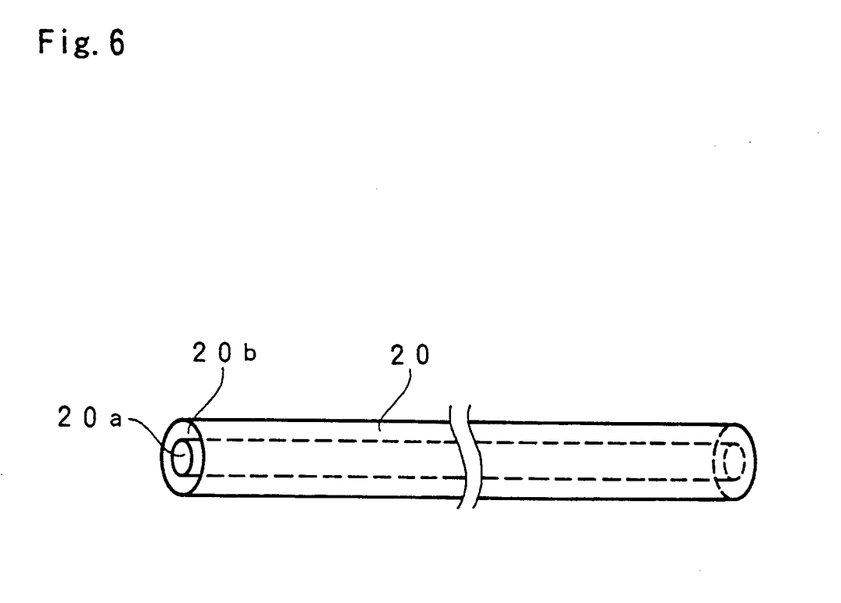
FIG. 6 shows a fiber sample formed by the machine of FIG. 5.

The optical fiber may be formed in the following manner. A preform having the core of optical functioning glass doped with $Nd^{3+}$ and codoped with the second rare earth ion such as $Pr^{3+}$ is prepared by a rod-intube method. The preform is loaded in a wire drawer as shown in FIG. 5 to draw the optical fiber. As shown in FIG. 5, the preform 21 is fixed to a feeder 22 and gradually descended. The preform 21 is heated by a heater 23 so that it is softened before it is drawn. The drawn fiber 20 is wound on a take-up drum 25 through a capstan 24. FIG. 6 shows an enlarged view of the optical fiber 20 thus formed. The optical fiber 20 comprises a core 20a doped with $Nd^{3+}$ and codoped with the second ion e.g. $Pr^{3+}$, $Yb^{3+}$, $Sm^{3+}$, $Tb^{3+}$, $Eu^{3+}$ and $Ho^{3+}$, and a clad layer 20b which has a lower refractive index that of the core 20a and having $Nd^{3+}$, $Pr^{3+}$ or other rare earth ion not added thereto.

With the optical fiber having the above optical functioning glass as the core, the application to a optically active device such as a fiber laser, a fiber amplifier, a fiber sensor and fiber logic gate can be attained. Since $Nd^{3+}$ as well as $Pr^{3+}$ or other rare earth ions are added to the core glass, the light amplification gain is attained at the 1.31 $\mu$m wavelength band and the loss due to the light emission at the 1.06 $\mu$m wavelength band is reduced. Further, the light is effectively confined in the core by the fiber structure and the light loss is very low so that the inverted distribution can be formed at a low threshold. Accordingly, the application to a high gain light amplifier is attained.

(2) Fiber Amplifier

The above optical fiber 20 may be used in a fiber amplifier at the 1.3 $\mu$m band.

Figure 7:
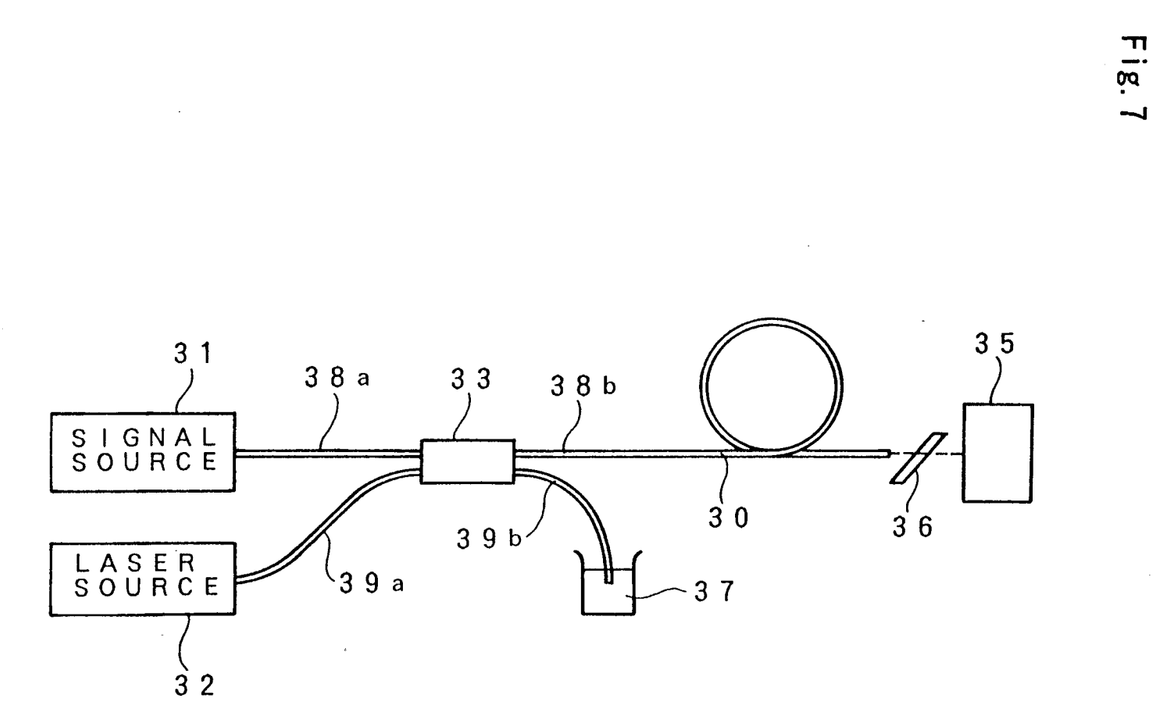
FIG. 7 shows an embodiment of a fiber amplifier.

As shown in FIG. 7, the fiber amplifier comprises an optical fiber doped with rare earth ions, an excitation laser source 32, and optical device 33, 38a, 38b, 39a and 39b. The optical fiber 30 functions as a light transmission line of the laser beam at the 1.3 $\mu$m band. The laser source 32 generates an excitation light at the 0.8 $\mu$m wavelength band. The optical device 33, 38a, 38b, 39a and 39b direct the excitation light from the laser source 32 to the optical fiber 30. The excitation light from the laser source 32 is directed to the fiber coupler 33 through the optical fiber 39a and combined with a signal light which is directed to the fiber coupler 33 from a signal light source 31 through the optical fiber 38a. The combined signal light and excitation light are coupled to the optical fiber 30 through the optical fiber 38b.

The fiber coupler 30 may be a fused bi-conical taper coupler which is formed by fusing and extending two optical fibers 38 and 39. The terminal of the optical fiber 39b which extends from the fiber coupler 33 is dipped in matching oil 37 so that a return light from the optical fiber 39b to the fiber coupler 33 is prevented.

An optical spectrum analyzer 35 is arranged at an output of the optical fiber 30 and a filter 36 is provided therebetween. The filter 36 cuts the excitation light outputted from the optical fiber 30. As a result, only the signal light outputted from the optical fiber 30 can be measured by the optical spectrum analyzer 35, and the gain of light amplification can be determined.

In accordance with the above fiber amplifier at the 1.3 $\mu$m wavelength band, $Nd^{3+}$ are excited by the laser beam at the 0.8 $\mu$m wavelength directed to the fiber by the optical device. Most of the excited $Nd^{3+}$ are induced by the signal light at the 1.3 $\mu$m wavelength band coupled to the fiber to generate the radiation light so that the light amplification at the 1.3 $\mu$m wavelength band is attained.

(3) Fiber Laser

The above optical fiber 20 may also be used as a fiber laser at the 1.3 $\mu$m wavelength band.

Figure 8:
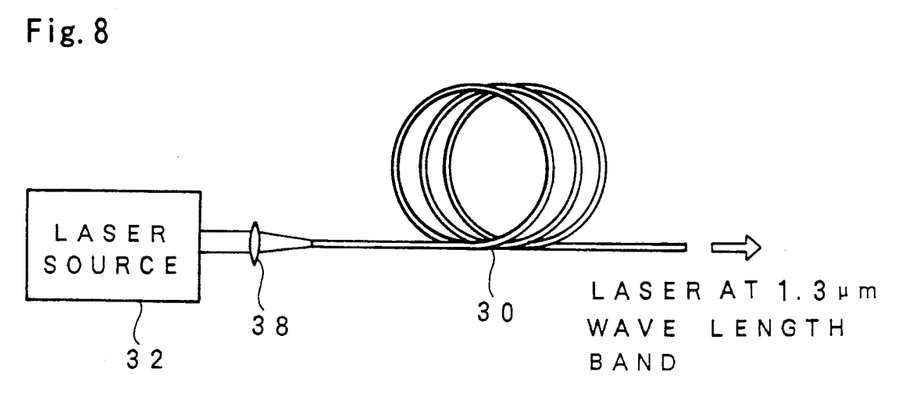
FIG. 8 shows an embodiment of a fiber laser.

As shown in FIG. 8, the fiber laser may comprise an optical fiber 30 doped with a rare earth element, a laser source 32 and optical device 38. A laser diode which generates an excitation light at the 0.8 $\mu$m wavelength band is used as the laser source 32. A lens which directs the excitation light from the laser source 32 to the optical fiber 30 is used as the optical device 38. The output end of the optical fiber is finished in an appropriate mirror plane and a resonance structure is formed by the output end and an end plane of the laser diode. Alternatively, the input/output ends of the optical fiber to which the excitation light is directed may be finished in mirror surface and the resonance structure may be formed by the input/output ends. Further, the resonance structure may be a conventional one which uses dielectric mirrors.

In the above fiber laser, the excitation light at the 0.8 $\mu$m wavelength band from the laser source 32 is directed to the optical fiber 30 by the optical device 38. $Nd^{3+}$ in the optical fiber 30 are excited to a predetermined state to permit the light emission at the wavelength of 1.3 $\mu$m. As a result, the laser oscillation at the 1.3 $\mu$m wavelength band occurs when the output of the excitation light exceeds a predetermined level.

(4) Waveguide Amplifier

Figure 9:
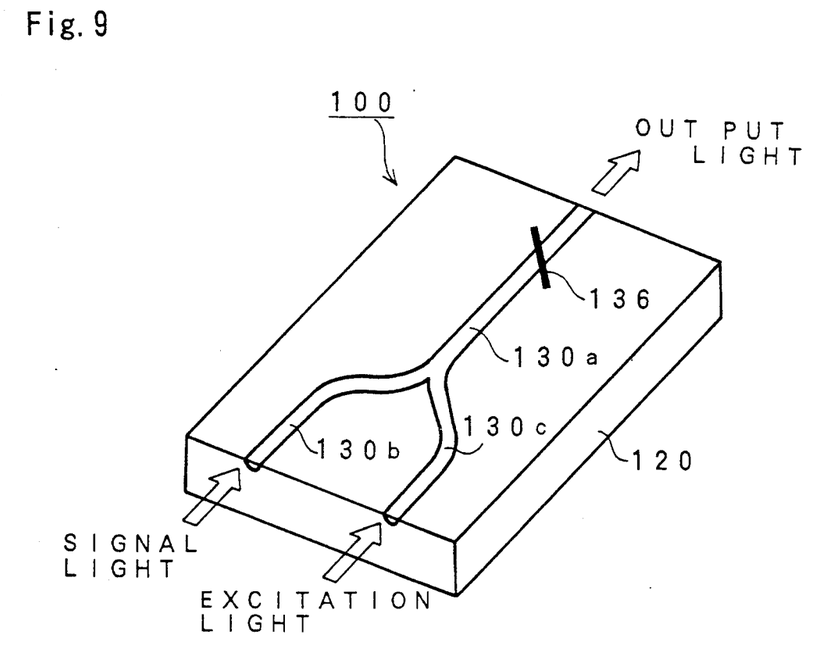
FIG. 9 shows an embodiment of a waveguide amplifier.

FIG. 9 shows an application to a waveguide amplifier. Planar waveguides 130a, 130b and 130c which branch in two lines are formed on a substrate 120. $Nd^{3+}$ as well as the second rare earth ion such as $Pr^{3+}$, $Yb^{3+}$, $Sm^{3+}$, $Eu^{3+}$ and $Ho^{3+}$ are added to the planar wave guide 130a. A filter 136 having a grating is formed at the other end of the planar wave guide 130a. A signal light at the 1.3 $\mu$m wavelength band is applied to the planar wave guide 130b. An excitation light at the 0.8 $\mu$m wavelength band is applied to the planar wave guide 130c. The laser source is similar to that shown in FIG. 3.

The operation of the fiber amplifier 100 of FIG. 4 is briefly explained. The signal light at the 1.3 $\mu$m wavelength band is coupled to the planar wave guide 130a through the planar wave guide 130b, and the excitation light at the 0.8 $\mu$m wavelength band from the laser source such as an LD is also directed to the planar wave guide 130a through the planar wave guide 130c. The excited $Nd^{3+}$ are stimulated by the signal light to generate the radiation light at the 1.3 $\mu$m wavelength band corresponding to the transition $^4F_{3/2}$ to $^4F_{13/2}$. When the excitation light exceeds the predetermined intensity, the signal light is amplified.

SPECIFIC EXAMPLES (1) Addition of $Pr^{3+}$ $Na_2O$, $Al_2O_3$ and $P_2O_5$ are prepared as raw materials of the host glass and they are mixed to form glass of $15Na_2O-15Al_2O_3-70P_2O_5$ (by mol percent). $Nd_2O_3$ and $Pr_2O_3$ are added thereto, and the mixture is molten in a platinum crucible. The amount of $Nd_2O_3$ is controlled such that the concentration of $Nd^{3+}$ is 500 ppm by weight to the host glass. The amount of $Pr_2O_3$ is controlled such that the weight concentration of $Pr^{3+}$ to the host glass are 0, 200, 500, 700 and 1000 ppm. Namely, the concentration of $Pr^{3+}$ to $Nd^{3+}$ are 0, 40, 100, 140 and 200%. The molten raw materials are fully mixed and quickly quench to form the glass.

In order to evaluate the light amplification characteristic of the glass, the fiber was prepared in the following manner. The glass having the above composition is made into a rod shape to form a glass rod for the core.

Glass which has substantially same composition as that of the glass rod and a slightly lower refractive index than that of the glass rod is prepared to form a clad pipe. The composition of the glass of the clad pipe is 2PbO-15Na$_2$O-15Al$_2$O$_3$-68P$_2$O$_5$ (mol %), and Nd$^{3+}$ or Pr$_2$O$_3$ is not added. The core rod and the clad pipe are formed into preforms which are drawn by the machine shown in FIG. 5. As a result, an SM fiber having a core diameter of 8 $\mu$m and an outer diameter of 125 $\mu$m was formed. The SM fiber was cut to a fiber sample of 10 m long for the measurement.

The evaluation of the characteristic of the fiber sample was done by a fiber amplifier shown in FIG. 7. The result is shown by a graph of FIG. 10.

Figure 10:
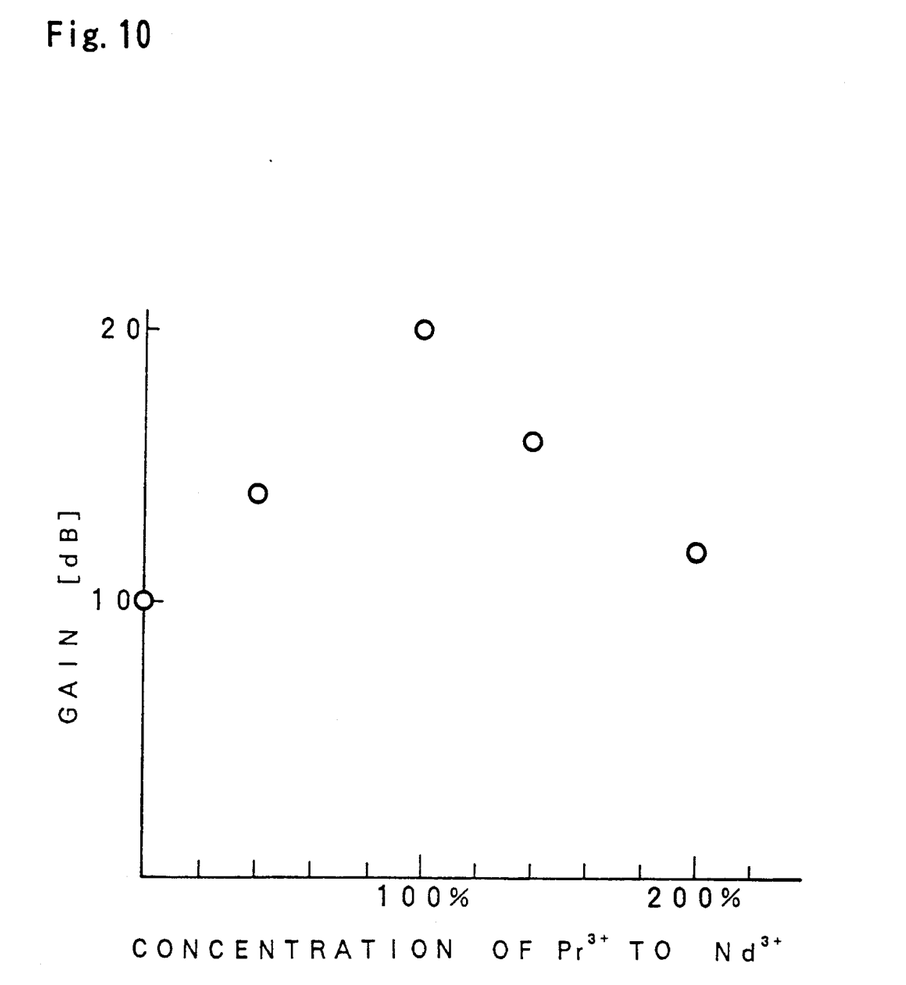
FIG. 10 shows a relationship between a gain of the fiber amplifier of FIG. 7 at 1.310 μm band and a concentration of $Pr^{3+}$.

The gain shown in FIG. 10 is at the wavelength of 1.310 $\mu$m. A Ti-saphaire laser is used as the laser source 32, the excitation wavelength is set to 0.78 $\mu$m, and the excitation light intensity is set to 100 mW. The input signal intensity is −30 dBm and the peak wavelength is 1.310 $\mu$m.

It is seen that a higher gain than a predetermined level is attained when the concentration of Pr$^{3+}$ added to the core glass is within the range of 50 to 150% to Nd$^{3+}$. When the concentration of Pr$^{3+}$ is less than 50%, the attainable gain is low because the concentration of Pr$^{3+}$ which function as the active ions is low and the probability that Pr$^{3+}$ exist in the vicinity of Nd$^{3+}$ is low. Another reason may be that sufficient Pr$^{3+}$ which fully absorb the light at the 1.06 $\mu$m wavelength band emitted by Nd$^{3+}$ do not exist. When the concentration of Pr$^{3+}$ is higher than 150%, the attainable gain is also low because the concentration of Pr$^{3+}$ which function as the active ions is so high that the signal light at the wavelength of 1.3 $\mu$m is absorbed by a tail portion of the absorption at 1.47 $\mu$m which Pr$^{3+}$ exhibit.

(2) Addition of Sm$^{3+}$ or Yb$^{3+}$

Na$_2$O, Al$_2$O$_3$ and P$_2$O$_5$ are prepared as raw materials for the host glass and they are mixed to form glass having composition of 15Na$_2$O-15Al$_2$O$_3$-70P$_2$O$_5$ (mol %). Predetermined amount of Nd$_2$O$_3$ and Sm$_2$O$_3$ or Yb$_2$O$_3$ are added thereto and they are molten in a platinum crucible. The amount of Nd$_2$O$_3$ is controlled such that the concentration of Nd$^{3+}$ is 500 ppm by weight to the host glass. The amount of Sm$_2$O$_3$ or Yb$_2$O$_3$ is controlled such that the weight concentrations of Sm$^{3+}$ or Yb$^{3+}$ to the host glass are 0, 200, 300, 400, 500, 600, 700 and 1000 ppm. The concentrations of Sm$^{3+}$ or Yb$^{3+}$ to Nd$^{3+}$ are 0, 40, 60, 80, 100, 120, 140 and 200%. The molten raw materials are fully mixed and quickly cooled to form the glass.

In order to evaluate the light amplification characteristic of the glass, the fiber was manufactured in the following manner. The glass of the above composition is formed into a rod shape to form a glass rod for a core. Glass which has substantially same composition as that of the glass rod and a slightly lower refractive index than that of the glass rod is prepared to form a clad pipe. The composition of the glass of the clad pipe is 2PbO-15Na$_2$O-15Al$_2$O$_3$-68P$_2$O$_5$ (mol %), and Nd$^{3+}$, Sm$_2$O$_3$ or Yb$_2$O$_3$ is not added. The core rod and the clad pipe are drawn by a rod-in tube method by the machine shown in FIG. 5 to form an SM fiber having a core diameter of 8 $\mu$m and an outer diameter of 125 $\mu$m. The SM fiber was cut to a fiber sample of 10 m long for measurement.

The evaluation of the characteristic of the fiber sample was done by the fiber amplifier shown in FIG. 7. The results are shown in the graphs of FIG. 11 and 12.

Figure 11:
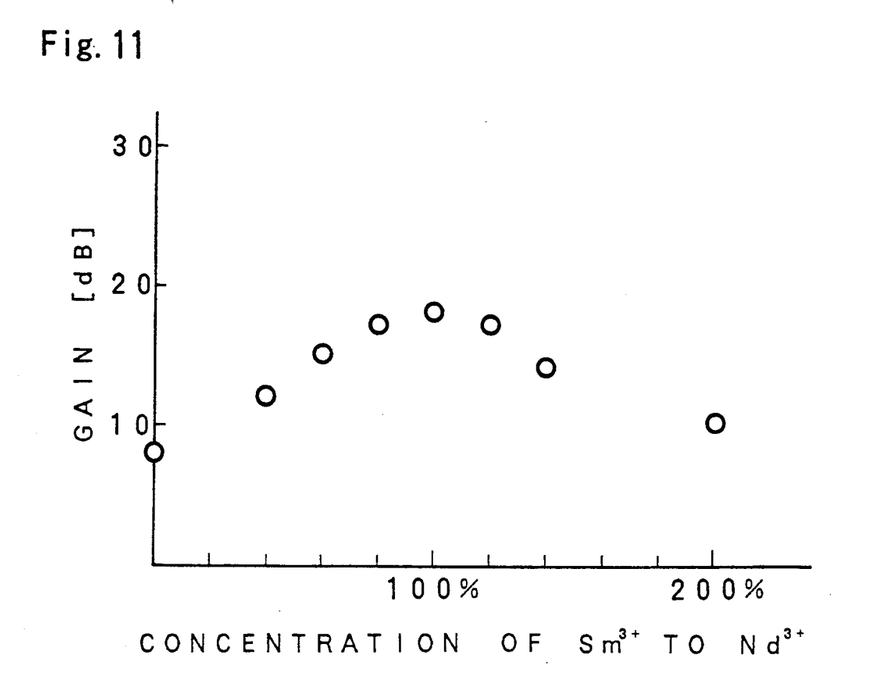
FIG. 11 shows a relationship between the gain of the fiber amplifier of FIG. 7 at the 1.310 μm band and a concentration of $Sm^{3+}$.
Figure 12:
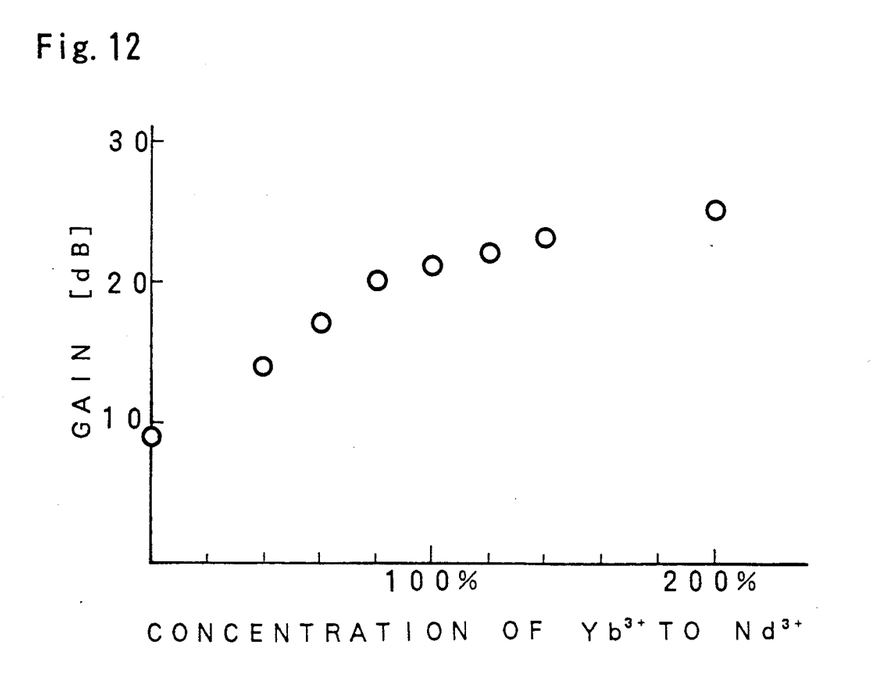
FIG. 12 shows a relationship between the gain of the fiber amplifier of FIG. 7 at the 1.310 μm band and a concentration of $Yb^{3+}$.

The gains shown in FIG. 11 and 12 are at 1.310 $\mu$m. The laser source 32 is a Ti-saphire laser having an excitation wavelength of 0.78 $\mu$m and an excitation output of 100 mW. An intensity of an input signal is −30 dB and a peak wavelength is 1.310 $\mu$m.

It is seen that a higher gain than a predetermined level is attained when the concentration of Sm$^{3+}$ added to the core glass to Nd$^{3+}$ is between 50% and 150%. When the concentration of Sm$^{3+}$ is lower than 50%, no substantial gain is attained because the concentration of Sm$^{3+}$ which function as the active ions is low and the probability that Sm$^{3+}$ are present in the vicinity of Nd$^{3+}$ is low. Another reason is that a sufficient amount of Sm$^{3+}$ to fully absorb the light at the 1.06 $\mu$m band emitted by Nd$^{3+}$ are not present. When the concentration of Sm$^{3+}$ is higher than 150%, no substantial gain is attained because the concentration of Sm$^{3+}$ which function as the active ions is so high that the signal light at 1.31 $\mu$m is absorbed by weak absorption in the vicinity of 1.3 $\mu$m which Sm$^{3+}$ exhibit.

On the other hand, it is also seen that the higher gain than the predetermined level is attained when the concentration of Yb$^{3+}$ added to the core glass together with Nd$^{3+}$ is higher than 50% to Nd$^{3+}$ and within an amount which does not deteriorate the glass forming ability. When the concentration is lower than 50%, the increase of the gain is not attained as it is not for Sm$^{3+}$. However, since Yb$^{3+}$ has no absorption at the 1.30 $\mu$m band etc., the gain is not reduced even if the concentration of Yb$^{3+}$ is increased.

(3) Addition of Ho$^{3+}$

Na$_2$O, Al$_2$O$_3$ and P$_2$O$_5$ are prepared as raw materials for the host glass, and they are mixed to form multi-ingredient glass having a composition of 15Na$_2$O-15Al$_2$O$_3$-70P$_2$O$_5$ (mol %). Predetermine amounts of Nd$_2$O$_3$ and Ho$_2$O$_3$ are added thereto and they are molten in a platinum crucible. The amount of Nd$_2$O$_3$ is controlled such that the concentration of Nd$^{3+}$ to the host glass is 1000 ppm by weight. The amount of Ho$_2$O$_3$ is controlled such that the weight concentrations of Ho$^{3+}$ to the host glass are 0, 100, 200, 300, 400, 500, 600, 700 and 1000 ppm. The concentrations of Ho$^{3+}$ to Nd$^{3+}$ are 0, 10, 20, 30, 40, 50, 60, 70 and 100%. The molten raw materials are fully mixed and quickly cooled to form the glass.

In order to evaluate the light amplification characteristic of the glass, the fiber was manufacture in the following manner. The multi-component glass having the above composition is formed into a rod shape to form a glass rod for a core. Glass having substantially some composition as that of the glass rod and a slightly lower refractive index than that of the of the glass rod is prepared to form a clad pipe. The glass of the clad pipe is multi-component glass having a composition of 2PbO-15Na$_2$O-15Al$_2$O$_3$-68P$_2$O$_5$ (mol %). No Nd$^{3+}$ or Ho$^{3+}$ is added to the multi-component glass. The core rod and the clad pipe are formed into preforms by the rod-in tube method and drawn by the machine shown in FIG. 5 to form an SM fiber having a core diameter of 8 $\mu$m and an outer diameter of 125 $\mu$m. The SM fiber was cut to a fiber sample of 10 m long for measurement.

The evaluation of the characteristic of the fiber sample was done by the fiber amplifier shown in FIG. 7. The result is shown in a graph of FIG. 13.

Figure 13:
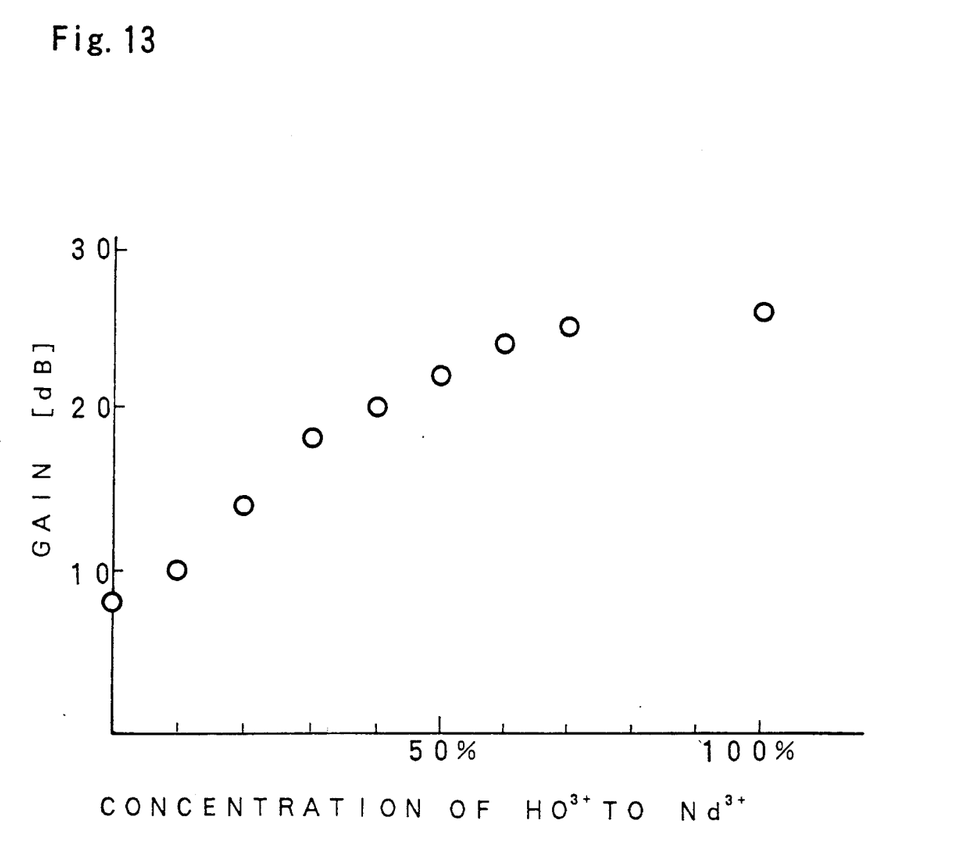
FIG. 13 shows a relationship between the gain of the fiber amplifier of FIG. 7 at the 1.310 μm band and a concentration of $Ho^{3+}$.

The gain shown in FIG. 13 is at 1.310 $\mu$m. The laser source 32 is a Ti-saphire laser having an excitation wavelength of 0.78 $\mu$m and an excitation output of 100 mW. An intensity of an input signal is −30 dBm and a peak wavelength is 1.310 μm.

It is seen that the gain of the fiber amplifier increases as the concentration of $Ho^{3+}$ added to the core glass increases. When the concentration of $Ho^{3+}$ to $Nd^{3+}$ exceeds 100%, the gain saturates and does not substantially increase.

When the concentration of $Ho^{3+}$ which serve as the absorbent is low, the probability that $Ho^{3+}$ are present in the vicinity of $Nd^{3+}$ is low and hence the gain reduces. Another reason is that a sufficient amount of $Ho^{3+}$ to fully absorb the light at the 0.88 μm band emitted by $Nd^{3+}$ are not present. When the concentration of $Ho^{3+}$ is higher than 100%, the concentration of $Ho^{3+}$ which function as the absorbent is so high that the light at the 0.88 μm wavelength band is fully absorbed. Therefore, the gain is not increased even if the amount of $Ho^{3+}$ is further increased.

(4) Addition of $Tb^{3+}$ or $Eu^{3+}$

Phosphate glass having $Nd^{3+}$ as well as $Tb^{3+}$ or $Eu^{3+}$ added thereto is prepared as optical functioning glass. The raw materials are mixed such that the composition of the host glass is $15Na_2O$-$15Al_2O_3$-$70P_2O_5$ (mol %). An oxide of $Nd^{3+}$ which functions as the active ion is added such that the concentration of $Nd^{3+}$ to the host glass is 1000 ppm by weight. An oxide of $Tb^{3+}$ or $Eu^{3+}$ which functions as a light emission promoter in added such that the weight concentrations of $Tb^{3+}$ or $Eu^{3+}$ to $Nd^{3+}$ are 0, 20, 30, 40, 50, 60, 70 and 100%.

In order to evaluate the light amplification characteristic of the glass, the optical fiber was manufactured in the following manner. The glass having the above composition is formed into a rod shape to form a glass rod for a core. Glass having a slightly lower refractive index than that of the glass rod and a composition of $2PbO$-$15Na_2O$-$15Al_2O_3$-$68P_2O_5$ (mol %) is prepared to form a clad pipe. No $Nd^{3+}$ is added to the glass of the clad pipe. The core rod and the clad pipe are formed into preform by the rod-in tube method and drawn by the wire drawer shown in FIG. 5 to form an SM fiber having a core diameter of 8 μm and an outer diameter of 125 μm. The SM fiber was cut to a fiber sample of 10 m long for measurement. The evaluation of the characteristic of the fiber sample was done by the fiber amplifier of FIG. 7.

The excitation light source 32 is a Ti-saphire laser having an excitation wavelength of 0.78 μm and an excitation output of 100 mW. The signal light source 31 is a semiconductor laser. An intensity of an input signal from the semiconductor laser to the optical fiber is −30 dBm and a peak wavelength is 1.310 μm.

Figure 14:
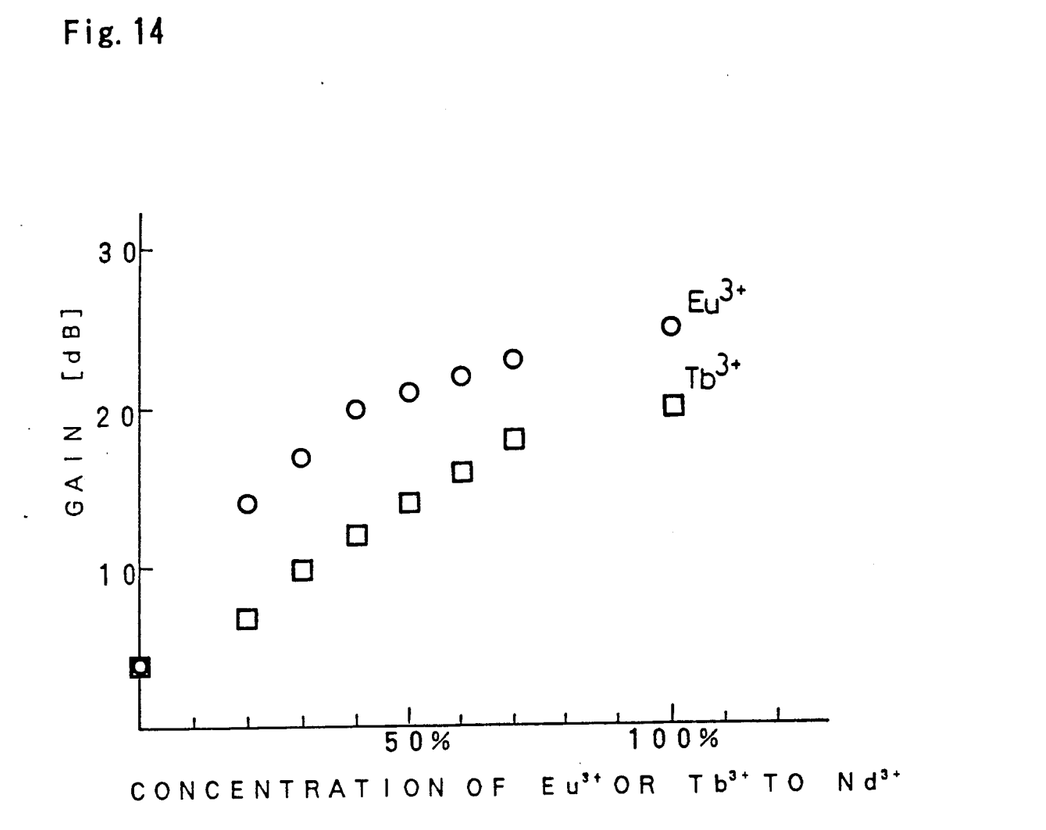
FIG. 14 shows a relationship between the gain of the fiber amplifier of FIG. 7 at the 1.310 μm band and a concentration of $Eu^{3+}$ or $Tb^{3+}$.

The result of evaluation of the characteristic of the fiber sample of the above optical functioning glass is show by a graph in FIG. 14. Square frames show the gain of $Tb^{3+}$ and circular frames show the gain of $Eu^{3+}$.

As seen from the graph, the gain increases by the addition of $Tb^{3+}$ or $Eu^{3+}$. In a conventional optical fiber having no active ion such as $Tb^{3+}$ added thereto, the gain is 4 dB, but where the active ions such as $Tb^{3+}$ are included by at least 20%, gain which is larger than 7 dB is attained. As the concentration of the active ions such as $Tb^{3+}$ increases, the gain of the fiber amplifier also increase because the probability that the active ions such as $Tb^{3+}$ are present in the vicinity of $Nd^{3+}$ is higher as the concentration of $Tb^{3+}$ increases. Another reason is that the probability of energy transmission from $Nd^{3+}$ which have electrons excited to the energy level $^4I_{13/2}$ to the active ions such as $Tb^{3+}$ is higher as the probability of adjacency of $Nd^{3+}$ and the active ions such as $Tb^{3+}$ goes higher. Effects of the Invention.

In accordance with the optical functioning glass of the present invention, the light emission and the light amplification at the 1.3 μm wavelength band are permitted by the presence of the excitation light, or the enhancement of the amplification efficiency is permitted. By forming the wave guide or the fiber by the optical functioning glass, the application to the light amplifier and the laser is attained. When it is used for the fiber, the fiber amplifier having a low threshold and a high gain is attain.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

We claim:

1. An optical functioning single glass doped with $Nd^{+3}$ as an active ion and codoped with at least one rare earth ion selected from the group consisting of $Pr^{3+}$, $Yb^{3+}$, $Sm^{3+}$ and $Ho^{3+}$, said at least one codoped rare earth ion functioning as an absorbent for light at and near 1 μm band.

2. An optical functioning glass according to claim 1 wherein a concentration of said rare earth ion is between 50% and 150%.

3. An optical fiber comprising:
   a core made of the optical functioning glass according to claim 1.

4. An optically active device comprising:
   an optical fiber according to claim 3 for propagating light at and near 1.3 μm band,
   an light source for generating an excitation light at 0.8 μm band, and
   optical means for directing the excitation light from said light source to said optical fiber.

5. A fiber amplifier comprising:
   an optically active device according to claim 4, coupling means for coupling signal light at 1.3 μm band into said optical fiber.

6. A fiber laser comprising:
   an optically active device according to claim 4, resonator means for feeding light at and near 1.3 μm band from said optical fiber back to said optical fiber.

7. A waveguide device comprising:
   a planar waveguide made of the optical functioning glass according to claim 1.

8. An optically active device comprising:
   a waveguide device according to claim 7 for propagating light at and near 1.3 μm band,
   an light source for generating an excitation light at 0.8 μm band, and
   optical means for directing the excitation light from said light source to said waveguide device.

9. A waveguide laser comprising:
   an optically active device according to claim 8, resonator means for feeding light at and near 1.3 μm band from said waveguide device back to said waveguide device.

10. A waveguide amplifier comprising:
    an optically active device according to claim 8, coupling means for coupling signal light at 1.3 μm band into said waveguide device.

* * * * *